US009451266B2

(12) United States Patent
Zheludkov et al.

(10) Patent No.: US 9,451,266 B2
(45) Date of Patent: Sep. 20, 2016

(54) OPTIMAL INTRA PREDICTION IN BLOCK-BASED VIDEO CODING TO CALCULATE MINIMAL ACTIVITY DIRECTION BASED ON TEXTURE GRADIENT DISTRIBUTION

(71) Applicant: Vanguard Video LLC, Palo Alto, CA (US)

(72) Inventors: Alexander C. Zheludkov, Saint-Petersburg (RU); Alexey Martemyanov, Saint-Petersburg (RU); Nikolay Terterov, Saint-Petersburg (RU)

(73) Assignee: Vanguard Video LLC, Palo Alto, CA (US)

( * ) Notice: Subject to any disclaimer, the term of this patent is extended or adjusted under 35 U.S.C. 154(b) by 122 days.

(21) Appl. No.: 14/154,709

(22) Filed: Jan. 14, 2014

(65) Prior Publication Data

US 2014/0126635 A1 May 8, 2014

Related U.S. Application Data

(62) Division of application No. 13/679,161, filed on Nov. 16, 2012, now Pat. No. 8,693,551.

(60) Provisional application No. 61/560,556, filed on Nov. 16, 2011.

(51) Int. Cl.
*H04N 7/12* (2006.01)
*H04N 19/137* (2014.01)
(Continued)

(52) U.S. Cl.
CPC ............ *H04N 19/137* (2014.11); *H04N 19/11* (2014.11); *H04N 19/119* (2014.11); *H04N 19/139* (2014.11); *H04N 19/14* (2014.11); *H04N 19/176* (2014.11); *H04N 19/51* (2014.11); *H04N 19/513* (2014.11); *H04N 19/52* (2014.11); *H04N 19/521* (2014.11); *H04N 19/523* (2014.11); *H04N 19/53* (2014.11); *H04N 19/567* (2014.11);
(Continued)

(58) Field of Classification Search
CPC ............................ H04N 19/139; H04N 19/14
See application file for complete search history.

(56) References Cited

U.S. PATENT DOCUMENTS 5,640,208 A 6/1997 Fujinami
5,671,018 A 9/1997 Ohara et al.
(Continued)

FOREIGN PATENT DOCUMENTS

| KR | 1020040068535 A | 7/2004 |
| KR | 1020120129629 A | 11/2012 |
| KR | 101210894 B1 | 12/2012 |

OTHER PUBLICATIONS

M. Schindler, A Fast Renormalisation for Arithmetic Coding, Proc. Data Compression Conference, Mar. 30-Apr. 1, 1998, p. 572, Snowbird, Utah, U.S.A.
(Continued)

*Primary Examiner* — Young Lee
(74) *Attorney, Agent, or Firm* — Fitch, Even, Tabin & Flannery LLP (57) ABSTRACT

Simplified selection of optimal intra prediction in block-based video coding based on texture gradient distribution and minimal activity direction. The minimal activity direction is defined by a vector ($\alpha$(B, W), $\beta$(B, W)) indicating minimal variation of a discrete function P(x, y) inside a spatial aria of block B with weights W.

4 Claims, 6 Drawing Sheets

(51) Int. Cl.
| | |
|---|---|
| H04N 19/176 | (2014.01) |
| H04N 19/119 | (2014.01) |
| H04N 19/51 | (2014.01) |
| H04N 19/513 | (2014.01) |
| H04N 19/593 | (2014.01) |
| H04N 19/11 | (2014.01) |
| H04N 19/14 | (2014.01) |
| H04N 19/53 | (2014.01) |
| H04N 19/523 | (2014.01) |
| H04N 19/567 | (2014.01) |
| H04N 19/139 | (2014.01) |
| H04N 19/52 | (2014.01) |
| H04N 19/65 | (2014.01) |
| H04N 19/19 | (2014.01) |
| H04N 19/533 | (2014.01) |

(52) U.S. Cl.
CPC ............ *H04N19/593* (2014.11); *H04N 19/65* (2014.11); *H04N 19/19* (2014.11); *H04N 19/533* (2014.11)

(56) References Cited

U.S. PATENT DOCUMENTS

| | | |
|---|---|---|
| 5,778,190 A | 7/1998 | Agarwal |
| 5,796,435 A | 8/1998 | Nonomura et al. |
| 5,812,788 A | 9/1998 | Agarwal |
| 6,044,115 A | 3/2000 | Horiike et al. |
| 6,055,330 A | 4/2000 | Eleftheriadis et al. |
| 6,081,554 A | 6/2000 | Lee et al. |
| 6,091,777 A | 7/2000 | Guetz et al. |
| 6,233,278 B1 | 5/2001 | Dieterich |
| 6,263,020 B1 | 7/2001 | Gardos et al. |
| 6,317,520 B1 | 11/2001 | Passaggio et al. |
| 6,434,196 B1 | 8/2002 | Sethuraman et al. |
| 6,438,168 B2 | 8/2002 | Arye |
| 6,445,828 B1 | 9/2002 | Yim |
| 6,459,427 B1 | 10/2002 | Mao et al. |
| 6,483,505 B1 | 11/2002 | Morein et al. |
| 6,496,607 B1 | 12/2002 | Krishnamurthy et al. |
| 6,594,395 B1 | 7/2003 | Forchheimer et al. |
| 6,597,739 B1 | 7/2003 | Li et al. |
| 6,683,992 B2 | 1/2004 | Takahashi et al. |
| 6,909,810 B2 | 6/2005 | Maeda |
| 6,925,126 B2 | 8/2005 | Lan et al. |
| 6,940,903 B2 | 9/2005 | Zhao et al. |
| 6,965,643 B1 | 11/2005 | Maeda et al. |
| 7,110,459 B2 | 9/2006 | Srinivasan |
| 7,336,720 B2 | 2/2008 | Martemyanov et al. |
| 7,440,502 B2 | 10/2008 | Altunbasak et al. |
| 8,023,562 B2 | 9/2011 | Zheludkov et al. |
| 8,891,633 B2 | 11/2014 | Zheludkov et al. |
| 2002/0061138 A1 | 5/2002 | Uenoyama et al. |
| 2003/0063667 A1 | 4/2003 | Sriram et al. |
| 2003/0231796 A1 | 12/2003 | Caviedes |
| 2005/0013497 A1 | 1/2005 | Hsu et al. |
| 2005/0024487 A1 | 2/2005 | Chen |
| 2005/0286630 A1 | 12/2005 | Tong et al. |
| 2006/0055826 A1 | 3/2006 | Zimmermann et al. |
| 2006/0062304 A1 | 3/2006 | Hsia |
| 2006/0153539 A1 | 7/2006 | Kaku |
| 2006/0222074 A1 | 10/2006 | Zhang |
| 2006/0262860 A1 | 11/2006 | Chou et al. |
| 2006/0262983 A1 | 11/2006 | Cheng et al. |
| 2007/0074266 A1 | 3/2007 | Raveendran et al. |
| 2010/0054331 A1 | 3/2010 | Haddad et al. |
| 2010/0165077 A1 | 7/2010 | Yin et al. |
| 2011/0194615 A1 | 8/2011 | Zheludkov et al. |
| 2011/0249739 A1 | 10/2011 | Liu et al. |
| 2012/0093222 A1 | 4/2012 | Zheludkov et al. |
| 2012/0243609 A1 | 9/2012 | Zheng |
| 2012/0257678 A1 | 10/2012 | Zhou et al. |
| 2013/0022119 A1 | 1/2013 | Chien et al. |
| 2013/0156343 A1 | 6/2013 | Hutchings |
| 2014/0064372 A1 | 3/2014 | Laroche et al. |
| 2014/0105296 A1 | 4/2014 | Alshina et al. |

OTHER PUBLICATIONS

G. N. N. Martin, Range encoding: an algorithm for removing redundancy from a digitized message, IBM UK Scientific Center (paper presented in Mar. 1979 to the Video & Data Recording Conference held in Southampton Jul. 24-27).

John Watkinson, The Engineer's Guide to Compression, 1996, pp. 62-72, Snell & Wilcox Ltd., Sunnyvale, California, U.S.A.

Yao Wang et al., Review of Error Resilient Coding Techniques for Real-Time Video Communications, IEEE Signal Processing Magazine, Jul. 2000, pp. 61-82, vol. 17, No. 4, USA.

Rui Zhang et al., Video Coding with Optimal Inter/Intra-Mode Switching for Packet Loss Resilience, IEE Journal on Selected Areas in Communications, Jun. 2000, pp. 966-976, vol. 18, No. 6, USA.

Minyoung Kim, et al., PBPAIR: An Energy-efficient Error-resilient Encoding Using Probability Based Power Aware Intra Refresh, Mobile Computing and Communications Review Publication, 2006, pp. 58-59, 10(3), Irvine, California, USA.

International Search Report and Written Opinion for PCT/US2012/065581 issued Jan. 10, 2013.

Alp Erturk and Sarp Erturk, "Two-Bit Transform for Binary Block Motion Estimation", IEEE Transactions on Circuits and Systems for Video Technology—TCSV, vol. 15, No. 7, pp. 938-946, 2005.

Sarp Erturk and Tae Gyu Chang, "Wavelet Domain One-Bit Transform for Low-Complexity Motion Estimation", IEEE International Symposium on Circuits and Systems—ISCAS, 2006.

Colin Doutre and Panos Nasiopoulos, "Motion Vector Prediction for Improving One Bit Transform Based Motion Estimation", IEEE International Conference on Acoustics, Speech, and Signal Processing (ICASSP 2008), Las Vegas, Nevada, pp. 805-808, Apr. 2008.

Youn-Long Steve Lin, Chao-Yang Kao Huang-Chih Kuo, Jian-Wen Chen, "VLSI Design for Video Coding: H.264/AVC Encoding from Standard Specification to Chip", DOI 10.1007/978-1-4419-0959-6_1, Springer Science+Busines Media, LLC 2010.

Maya Gokhale and Paul S. Graham "Reconfigurable Computing. Accelerating Computation with Field-Programmable Gate Arrays" Springer, 2005.

Fig. 7

OPTIMAL INTRA PREDICTION IN BLOCK-BASED VIDEO CODING TO CALCULATE MINIMAL ACTIVITY DIRECTION BASED ON TEXTURE GRADIENT DISTRIBUTION This application is divisional of U.S. patent application Ser. No. 13/679,161, filed Nov. 16, 2012, which claims benefit of U.S. Provisional Application No. 61/560,556, filed Nov. 16, 2011, both of which are hereby incorporated herein by reference in their entirety.

FIELD OF THE INVENTION

This application relates to video encoding systems, preferably to methods for making coding decisions and estimating coding parameters for using in video coding standards, in particular, in High Efficiency Video Coding (HEVC) specifications for video compression.

BACKGROUND OF THE INVENTION

Video encoding is employed to convert an initial video sequence (a set of video images, also named pictures, or frames) into a corresponding encoded bitstream (a set of compressed video sequence binary data), and also converting video sequence binary data produced by a video codec system into a reconstructed video sequence (a decoded set of video images, or reconstructed frames). Most video coding standards are directed to provide the highest coding efficiency, which is the ability to encode a video sequence at the lowest bit rate while maintaining a certain level of video quality.

Most video sequences contain a significant amount of statistical and subjective redundancy within and between pictures that can be reduced by data compression techniques to make its size smaller. First the pictures in the video sequence are divided into blocks. The latest standard, the High Efficiency Video Coding (HEVC) uses blocks of up to 64×64 pixels and can sub-partition the picture into variable sized structures. HEVC initially divides a picture into coding tree units (CTUs), which are then divided into coding tree blocks (CTBs) for each luma/chroma component. The CTUs are further divided into coding units (CUs), which are then divided into prediction units (PUs) of either intra-picture or inter-picture prediction type. All modern video standards including HEVC use a hybrid approach to the video coding combining inter-/intra-picture prediction and 2D transform coding.

The intra-coding treats each picture individually, without reference to any other picture. HEVC specifies 33 directional modes for intra prediction, wherein the intra prediction modes use data from previously decoded neighboring prediction blocks. The prediction residual is the subject of Discrete Cosine Transform (DCT) and transform coefficient quantization.

The inter-coding is known to be used to exploit redundancy between moving pictures by using motion compensation (MC), which gives a higher compression factor than the intra-coding. According to known MC technique, successive pictures are compared and the shift of an area from one picture to the next is measured to produce motion vectors. Each block has its own motion vector which applies to the whole block. The vector from the previous picture is coded and vector differences are sent. Any discrepancies are eliminated by comparing the model with the actual picture. The codec sends the motion vectors and the discrepancies.

The decoder does the inverse process, shifting the previous picture by the vectors and adding the discrepancies to produce the next picture. The quality of a reconstructed video sequence is measured as a total deviation of it's pixels from the initial video sequence.

In common video coding standards like H.264 and HEVC (High Efficiency Video Coding) intra predictions for texture blocks include angular (directional) intra predictions and non-angular intra predictions (usually, in DC intra prediction mode and Planar prediction mode). Angular intra prediction modes use a certain angle in such a way that for texture prediction the data of the neighboring block pixels is propagated to the block interior at such angle. Due to the sufficient amount of possible intra prediction angles (e.g. 33 in HEVC specification) the procedure of choosing the optimal intra prediction may become very complex: the most simple way of the intra prediction mode selection is calculating all the possible intra predictions and choosing the best one by SAD (Sum of Absolute Difference), Hadamard SAD, or RD (Rate Distortion) optimization criterion.

However, the computational complexity of this exhaustive search method grows for a large number of possible prediction angles. To avoid an exhaustive search, an optimal intra prediction selection procedure is important in the video encoding algorithms. Moreover, the nature of the modern block-based video coding standards is that they admit a large variety of coding methods and parameters for each texture block formation and coding. Accommodating such a need requires selecting an optimal coding mode and parameters of video encoding.

The HEVC coding standard, however, extends the complexity of motion estimation, since the large target resolution requires a high memory bandwidth; large blocks (up to 64×64) require a large local memory; an 8-taps interpolation filter provides for a high complexity search of sub-pixel; and ½ and ¾ non-square block subdivisions require complex mode selection.

SUMMARY

The above needs and others are at least partially met through provision of the methods pertaining to selection of an optimal intra prediction mode and partitions, and to motion estimation for inter coding described in the following description.

Methods for Choosing the Optimal Intra Coding Mode.

The methods described by Algorithm 1 and Algorithm 2 set forth herein are used for reducing the set of possible optimal intra predictions (testing sets) in the HEVC algorithm. Algorithm 3 and Algorithm 4 as appear in the present application provide low complexity methods for associating the appropriate intra prediction angle with the texture block using the concept of Minimal Activity Direction. The present application also teaches an efficient method of selecting the optimal intra prediction mode which is provided by Algorithm 5. The method of choosing the best intra block subdivision in HEVC (Algorithm 6) is based on calculation of the Minimal Activity Directions.

Inter Coding Methods: Calculation for Fast Motion Estimation and Optimal Block partition.

The HEVC specification assumes a huge number of options when texture partitioning into inter coded blocks, each of which can have its own motion vector for inter texture prediction. Choosing the optimal partitions and the optimal motion vector requires advanced methods for the texture motion estimation and analysis. The present application provides integral methods for texture motion analysis targeted for usage in the HEVC video coding. These methods include the motion analysis for all possible partitions of the entire Coding-Tree Unit (CTU) and yield the motion vectors for all those partitions together with the recommendations for texture inter coding partition. The motion analysis method for the partitions of the entire Coding Unit Tree is provided in the Algorithm 7 described herein, while Algorithm 8 (described below) provides the multi-pass motion vectors refinement and Algorithm 9 (also described below) provides local transform-based motion estimation.

The system is targeted mainly to the HEVC specifications for video compression. Those skilled in the art, however, will appreciate that most of the described algorithms (both for intra and inter coding) may be used in conjunction with other video coding standards as well.

DETAILED DESCRIPTION

Generally speaking, pursuant to the following various embodiments, the encoding methods are directed to: searching for optimal angular prediction in an intra-prediction mode based on minimal activity directions; choosing the best intra block subdivision using minimal activity directions and strengths; and providing motion estimation for tree-structured inter coding of the HEVC specifications. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

Presented below are the preferred embodiments (algorithms) for each of the methods. Though preferred, it will be understood that these embodiments are offered for illustrative purposes and without any intent to suggest any particular limitations in these regards by way of the details provided.

Figure 1:
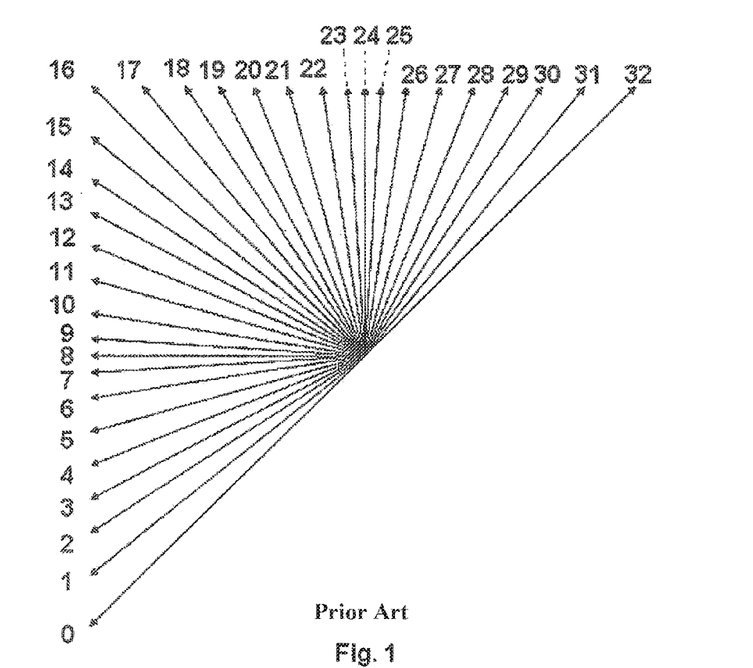
FIG. 1 shows a flow diagram of angular intra prediction directions in the HEVC specification.
Figure 2:
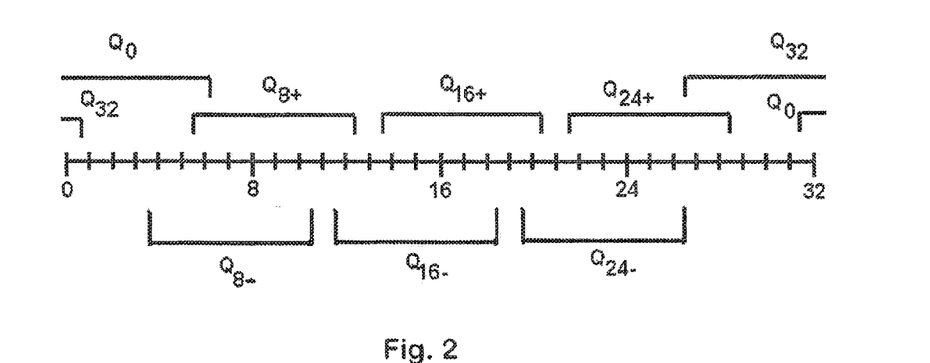
FIG. 2 shows testing sets Q for intra-prediction according to Algorithm 2

Selection of Optimal Angular Intra Prediction Mode in Block-Based Video Coding These teachings are directed to simplify the way of choosing the best directional intra prediction modes in block-based video coding. By way of illustration, FIG. 1 depicts the intra-prediction directions as provided by the HEVC specification. However, the proposed method is not limited to HEVC and can be applicable with corresponding evident modifications to any set of the directional intra predictions.

The angular intra predictions corresponding to the directions in FIG. 1 are defined as $P_0, P_1, \ldots, P_{32}$, the corresponding angles as $\gamma_0, \gamma_1, \ldots \gamma_{32}$, and the planar and DC prediction mode as $P_{33}, P_{34}$, respectively. The prediction cost function $R(P_j)$ represents the best mode selection. It may be SAD function; Hadamard SAD function; Rate-Distortion-based cost function, and so forth. The smaller is the value of $R(P_j)$, the more preferable the prediction $P_j$.

The intra predictions corresponding to the directions $P_0, P_1, \ldots, P_{32}$ are represented by the following sets:

$S_{32} = \{P_{16}\};$ $S_{16} = \{P_8, P_{24}\};$ $S_8 = \{P_0, P_8, P_{16}, P_{24}, P_{32}\};$ $S_4 = \{P_0, P_4, P_8, P_{12}, P_{16}, P_{20}, P_{24}, P_{28}, P_{32}\};$ $S_2 = \{P_0, P_2, P_4, P_6, P_8, P_{10}, P_{12}, P_{14}, P_{16}, P_{18}, P_{20}, P_{22}, P_{24}, P_{26}, P_{28}, P_{30}, P_{32}\}.$

One efficient way to significantly restrict the number of checked intra predictions is to use a logarithmic search inside a set of intra prediction directions. One corresponding method, which is described by Algorithm 1, comprises:

(i) selecting a starting set of intra prediction directions, a value $L \in \{32, 16, 8, 4, 2\}$ and a cost function $R(P_K)$, depending on the desired speed and coding quality, where K is the index of this intra prediction;

(ii) from the set $S_L$, finding an intra prediction providing the minimal value of the cost function $R(P)$;

(iii) finding an intra prediction which minimizes the value of $R(P)$ over $P \in \{P_K, P_{K-L/2}, P_{K+L/2}\};$ (iv) setting a threshold $T_0$, which is a pre-defined parameter depending on a desired speed, quality, block size, and so forth;

if K=2, or $R(P_K) < T_0$, going to the next step; otherwise, performing step (iii) for L=L/2;

(v) if K=2, selecting an optimal intra prediction from a set $\{P_K, P_{K-1}, P_{K+1}, P_{33}, P_{34}\}$ as a prediction minimizing the value $R(P)$; otherwise the optimal intra prediction is $R(P_K)$.

Another approach to efficiently restricting the search is initially checking a small number of intra predictions, and constructing the testing set of the intra prediction angles around the best angle from the initial subset. This approach can significantly reduce the number of tests and is described below as Algorithm 2:

select an initial set $\{P_0, P_8, P_{16}, P_{24}, P_{32}\}$ for finding an intra prediction $P_K$ minimizing the value of cost function $R(P)$, wherein K is the index of this intra prediction;

set a threshold $T_0$, which is a pre-defined parameter of the method depending on desired speed, quality, block size, and so forth;

if $R(P_K) < T_0$, the optimal prediction is $P_K$, and no further action is required;

if $R(F_K) \geq T_0$, proceed to test the following sets of intra predictions:

$Q_0 = \{P_{32}, P_0, P_1, P_2, P_3, P_5, P_6\};$ $Q_{8-} = \{P_4, P_5, P_6, P_7, P_8, P_9, P_{10}\};$ $Q_{8+} = \{P_6, P_7, P_8, P_9, P_{10}, P_{11}, P_{12}\};$ $Q_{16-} = \{P_{12}, P_{13}, P_{14}, P_{15}, P_{16}, P_{18}, P_{19}\};$ $Q_{16+} = \{P_{14}, P_{15}, P_{16}, P_{17}, P_{18}, P_{19}, P_{20}\};$ $Q_{24-} = \{P_{20}, P_{21}, P_{22}, P_{23}, P_{24}, P_{25}, P_{26}\};$ $Q_{24+} = \{P_{22}, P_{23}, P_{24}, P_{25}, P_{26}, P_{27}, P_{28}\};$ $Q_{32} = \{P_0, P_{27}, P_{28}, P_{29}, P_{30}, P_{31}, P_{32}\}.$ choose the intra prediction set Q according to the following requirements:
if K=0 or K=32, the intra prediction set $Q=Q_K$;
if K≠0 and K≠32, then:
  if R $(P_{K-8})$<R$(P_{K+8})$, $Q=Q_{K-}$, and
  if R$(P_{K-8})$≥R$(P_{K+8})$; $Q=Q_{K+}$; and
find the optimal intra prediction from the set $Q=Q_K \cup \{P_{33}, P_{34}\}$, as the one minimizing the value of R(P).

Accordingly, the present method significantly reduces the number of intra predictions to be checked. The sets $Q_0$, $Q_{8-}$, $Q_{8+}$, $Q_{16-}$, $Q_{16+}$, $Q_{24-}$, $Q_{24+}$, $Q_{32}$ may also be constructed as some subsets of those defined above according to the desired speed, quality, or other measure of interest.

Method of Choosing a Best Intra Prediction Mode Based on Texture Gradient Analysis These teachings are based on analyzing the distribution of texture gradients inside a texture block and on its reconstructed boundaries. It is based on a concept of Minimal Activity Direction (MAD) introduced in this description. A minimal activity direction is defined herein as a direction inside the area S in which the variation of a function P(x, y) is minimal. In particular, if the function P(x, y) represents the pixel brightness values of N×M picture, the minimal activity direction of the picture area is the direction of the most noticeable boundaries and lines inside a selected area S. The greater is the minimal activity direction strength, the brighter the corresponding line over the background. If the area S consists of a single point, the minimal activity direction is just the direction orthogonal to the gradient vector at this point.

Figure 3:
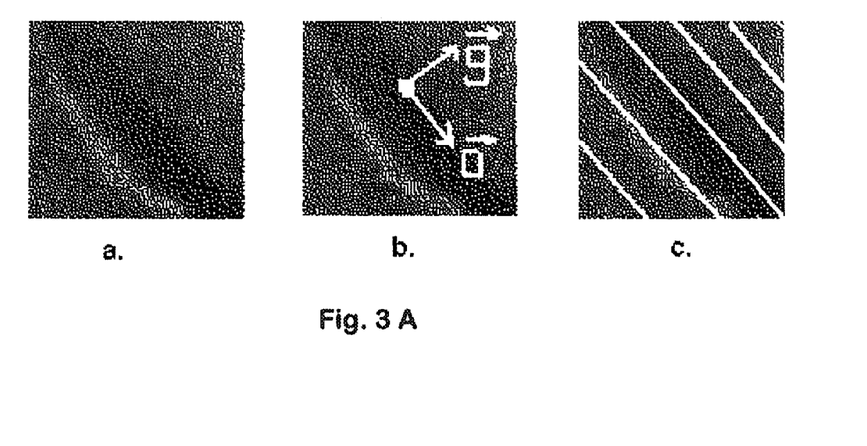
FIGS. 3A-3B illustrate a Minimal Activity Directions concept.

FIGS. 3A and 3B illustrate the concept of minimal activity direction. FIG. 3A illustrates the minimal activity direction for optimal intra prediction: FIG. 3A (a) shows the initial block; 3A(b)—the gradient vector g and minimal activity direction o for a single point; 3A(c)—the minimal activity directions for the whole block. In FIG. 3B the picture is divided into 16×16 blocks, and the minimal activity directions are drawn for all of them for the case of equal weights W. Therefore, the minimal activity directions may be used in selection of the optimal intra prediction.

In this section some auxiliary terms and notations are provided.

Let's introduce the following notations:
P(x, y) is a discrete function of two arguments defined at the rectangular set of integer pairs $R = \overline{\{0, N-1\}} \times \overline{\{0, M-1\}}$;
S is a set of integer coordinate pairs (x, y); $S \subseteq R$;
W(x, y) is a set of non-negative weight coefficients defined at (x, y) ∈S (in the simplest case, the value of non-negative weight W(x, y) may be chosen to be equal to 1);

$D_X(x,y) = (P(x+1,y) - P(x-1,y))/2;$ and $D_Y(x,y) = (P(x,y+1) - P(x,y-1))/2;$ where $D_x(x, y)$ is any measure of P(x, y) function variation with respect to the first argument, and $D_y(x, y)$ is any measure of P(x, y) function variation with respect to the second argument in the neighborhood of the (x, y) point.

Let's assume that $\Sigma W(x, y) \cdot D_x^2(x, y) + \Sigma W(x, y) \cdot D_y^2(x, y) \neq 0$ and find a minimal activity direction defined by a vector (α(S,W), β(S,W)), which will be the solution of the following minimization problem:

$$\sum_{(x,y)\in S} W(x, y) \cdot (\alpha \cdot D_X(x, y) + \beta \cdot D_Y(x, y))^2 \xrightarrow[\alpha,\beta]{} \min$$

wherein $\alpha^2 + \beta^2 = 1$.

Similarly, the minimal activity angle ϕ(S,W) can be found by solving the following minimization problem:

$$\sum_{(x,y)\in S} W(x, y) \cdot (\cos(\varphi) \cdot D_X(x, y) + \sin(\varphi) \cdot D_Y(x, y))^2 \xrightarrow[\alpha,\beta]{} \min$$

wherein α=cos(ϕ) and β=sin(ϕ).

The solution (α(S,W), β(S,W)) of the problem above is defined up to a certain precision, and the corresponding angle ϕ is defined up to a multiple of π. The corresponding angle ϕ can be calculated from (α(S,W), β(S,W)) for example as ϕ(S,W)=arccos(α(S,W)).

The direction defined by the vector (α(S,W), β(S,W)) or by the angle ϕ(S,W) is referred to herein as the minimal activity direction.

Calculating an Angular Intra Mode Defined by Minimal Activity Direction

For present purposes on may define the angular intra prediction modes as $\{P_0, P_1, \ldots, P_{T-1}\}$, and the corresponding prediction angles as $\{\gamma_0, \gamma_1, \ldots, \gamma_{T-1}\}$. Using the minimal activity direction as defined above, one can calculate the following functions for a texture block B, where S is a spatial area which may coincide with B or include I, as follows:

$$E = \left(\sum_{(x,y)\in S} W(x, y) \cdot D_X^2(x, y) - \sum_{(x,y)\in S} W(x, y) \cdot D_Y^2(x, y)\right),$$

$$F = \sum_{(x,y)\in S} W(x, y) \cdot D_X(x, y) \cdot D_Y(x, y),$$

$$A = \sqrt{\frac{E^2}{E^2 + 4 \cdot F^2}}$$

The calculations will be considered separately for the following four cases:
1. E≤0 and F<0;
2. E>0 and F<0;
3. E≥0 and F≥0; and
4. E<0 and F≥0.

It can be seen that the above four cases correspond to the following intervals of the angle ϕ(S,W) values: [0; π/4], [π/4, π/2], [π/2, 3π/4] and [3π/4, π], respectively.

Algorithm 3.

By this approach, the angular intra prediction modes can be calculated using the signs of E and F and the value of the ratio $$\left|\frac{E}{F}\right|$$

or $$\left|\frac{F}{E}\right|.$$

Using this approach, one can define the case number $j=\overline{1,4}$ according to the values of E and F as described above.

The method comprises:

for each case, calculating the minimal activity direction $(\alpha(S,W), \beta(S,W))$ as follows:

1. For $E \leq 0$ and $F<0$:

$$\begin{pmatrix} \alpha(S,W) \\ \beta(S,W) \end{pmatrix} = \begin{pmatrix} \sqrt{(1+A)/2} \\ \sqrt{(1-A)/2} \end{pmatrix}$$

2. For $E>0$ and $F<0$:

$$\begin{pmatrix} \alpha(S,W) \\ \beta(S,W) \end{pmatrix} = \begin{pmatrix} \sqrt{(1-A)/2} \\ \sqrt{(1+A)/2} \end{pmatrix}$$

3. For $E \geq 0$ and $F \geq 0$:

$$\begin{pmatrix} \alpha(S,W) \\ \beta(S,W) \end{pmatrix} = \begin{pmatrix} -\sqrt{(1-A)/2} \\ \sqrt{(1+A)/2} \end{pmatrix}$$

4. For $E<0$ and $F \geq 0$:

$$\begin{pmatrix} \alpha(S,W) \\ \beta(S,W) \end{pmatrix} = \begin{pmatrix} -\sqrt{(1+A)/2} \\ \sqrt{(1-A)/2} \end{pmatrix}$$

calculating the corresponding angle $\phi(S,W) \in [0; \pi]$ as $\phi(S,W) = \arccos(\alpha(S,W))$;

finding $\gamma_k \in \{\gamma_0, \gamma_1, \ldots, \gamma_{T-1}\}$ as intra prediction angle closest to the calculated minimal activity angle $\phi(S,W)$; and choosing $P_k$ as the intra prediction mode defined by the minimal activity direction calculated above.

Algorithm 4.

Figure 4:
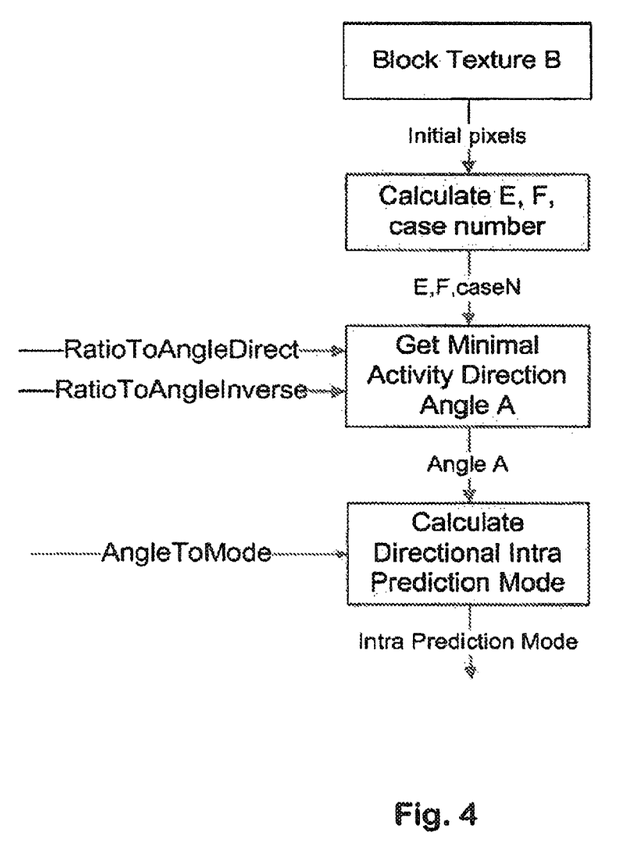
FIG. 4 shows a flow diagram of calculating direction intra prediction mode using pre-calculated tables.

FIG. 4 shows another approach, in which an approximate calculation of the minimal activity directions and the corresponding angular intra prediction mode is performed using pre-calculated tables. This method comprises:

considering some sufficiently large integers K and L defining the accuracy of the calculations (for example, both equal to 256);

pre-calculating constant integer array AngleToMode[ ] of the size K+1 providing the correspondence between a prediction angle $\phi \in [0; \pi]$ and a prediction mode index P in the following way:

AngleToMode[round(K·$\phi$/$\pi$)]=$P_k$, wherein round(x) means rounding x to the closest integer;

pre-calculating for each $j=\overline{1,4}$ four tables RatioToAngleDirect[j][ ] of the size L+1 providing the correspondence between the ratio $|E/F| \in [0;1]$ and the prediction angle $\phi \in [0; \pi]$ in the following way:

RatioToAngleDirect[j] [round (L·|E/F|)]=round(K·$\phi$/$\pi$), wherein $\phi \in [0; \pi]$;

pre-calculating for each $j=\overline{1,4}$ four tables RatioToAngleInverse[j][ ] of the size L+1 providing the correspondence between the ratio $|F/E| \in [0;1]$ and the prediction angle $\phi \in [0; \pi]$ in the following way:

RatioToAngleInverse[j][round(L·|F/E|)]=round(K·$\phi$/$\pi$), where $\phi \in [0; \pi]$;

calculating the values E and F as described above;

choosing the case number $j=\overline{1,4}$ according to the signs of E and F:

if $|E/F| \in [0;1]$, calculating the prediction mode $P_k$ defined by the minimal activity direction as:

$P_k$=AngleToMode[RatioToAngleDirect[j] [round (L·|E|E/F|)]];

if $|F/E| \in [0;1]$, calculate the prediction mode $P_k$ defined by the minimal activity direction as:

$P_k$=AngleToMode[RatioToAngleInverse[j][ round(L·|F/E|)]].

The tables RatioToAngleDirect and RatioToAngleInverse may be pre-calculated using explicit expressions for the minimal activity directions given above in this section.

Minimal Activity Direction Strengths

These teachings contemplate a set of the following values as the strength of the minimal activity direction defined by $(\alpha, \beta)$, where $\alpha^2+\beta^2=1$:

$$C_1(\alpha, \beta, S, W) = \frac{\sum_{(x,y) \in S} W(x,y) \cdot (-\beta \cdot D_X(x,y) + \alpha \cdot D_Y(x,y))^2}{\sum_{(x,y) \in S} W(x,y)},$$

$$C_2(\alpha, \beta, S, W) = \frac{\sum_{(x,y) \in S} W(x,y) \cdot (-\beta \cdot D_X(x,y) + \alpha \cdot D_Y(x,y))^2}{\sum_{(x,y) \in S} W(x,y) \cdot (\alpha \cdot D_X(x,y) + \beta \cdot D_Y(x,y))^2}$$

If $(\alpha,\beta)$ defines the minimal activity direction for the block B with weights W, then the corresponding values of $C_1$, $C_2$ will be denoted simply as $C_1(B,W)$, $C_2(B,W)$ and will be called the minimal activity direction (MAD) strengths.

Simplifying the Optimal Intra Predictions Selection

A related video coding problem is to select the optimal intra prediction from a set of angular intra predictions for angles $\gamma_0, \gamma_1 \ldots \gamma_{T-1}$ (enumerated monotonically clockwise or counterclockwise) as well as from DC and Planar predictions. A known most simple way to solve this problem is to calculate all possible intra predictions and choose the best mode by SAD, HAD or RD optimization criterion. These teachings provide a way of minimizing the number of intra predictions that need to be checked explicitly.

Algorithm 5.

Figure 5:
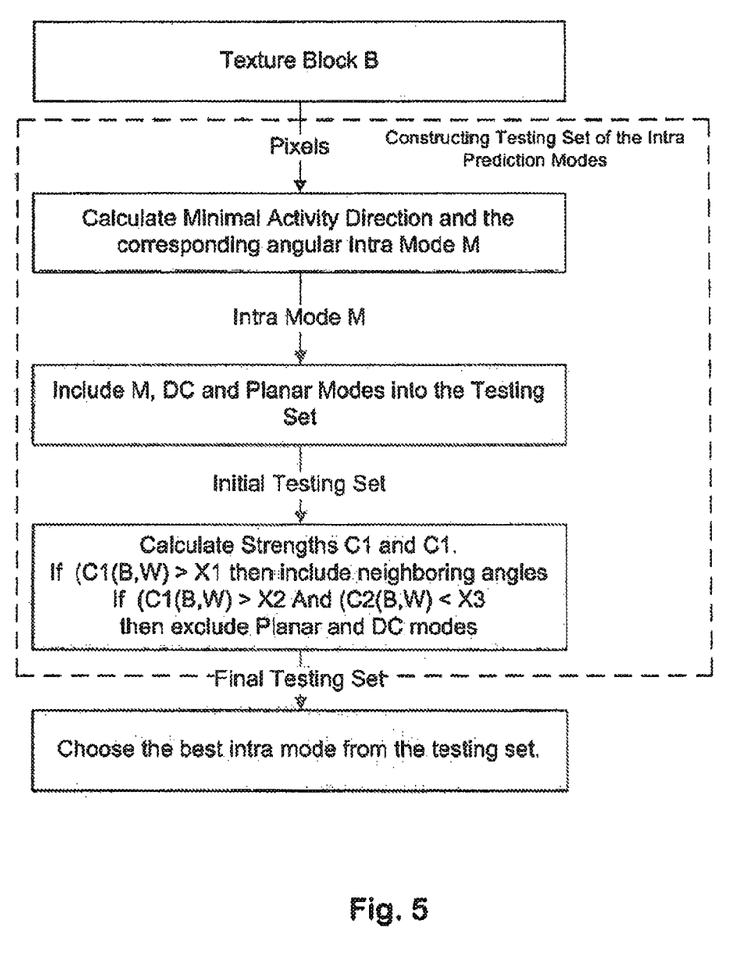
FIG. 5 shows a flow diagram of choosing the best intra mode using a minimal activity direction calculation.

FIG. 5 shows a flow diagram for a method of simplified selection of optimal intra prediction using the concept of minimal activity direction strength as introduced above. The method comprises:

choosing a texture block B of the size L×L starting from pixel with coordinates (x, y), for which the intra prediction is to be selected;

choosing a spatial area S including block B, wherein in the simplest case S may coincide with B;

choosing the weights matrix for S, wherein in the simplest case all the weights w(j,k)=1;

calculating the minimal activity direction and intra prediction mode $m_k$ defined by this direction as described above;

defining a set Q of intra predictions to be checked for the optimal intra prediction selection as one including angular prediction $m_k$, non-angular predictions (Planar prediction and/or DC prediction) and, optionally, some angular prediction modes corresponding to the angles neighboring to that defined by the mode $P_k$;

defining constants $X_1$, $X_2$, $X_3$ for parameters selected according to the desired speed and quality of the method;

if the MAD strength $C_1(\tilde{B},W) < X_1$, the angular predictions for the angles $\gamma_k$, $\gamma_{k-1}$, $\gamma_{k+1}$ may be excluded from the set Q; and if $C_1(\tilde{B}, W) > X_2$ and $C_2(\tilde{B}, W) < X_3$, the DC and planar predictions may be excluded from the set Q; and selecting the optimal intra prediction from the remaining set by a simple explicit check.

Choosing a Best Intra Block Size Based on Minimal Activity Directions and Strengths Here one may select an intra block B of the size L×L starting from a pixel with coordinates (x, y) that can be predicted by the angular intra prediction for angles $\gamma_0, \gamma_1 \ldots \gamma_{T-1}$ (enumerated monotonically clockwise or counterclockwise) and also by DC and Planar predictions. Instead of using L×L intra prediction, the block B may be divided into 4 sub-blocks $B_j$ of the size $$\frac{L}{2} \times \frac{L}{2},$$

where j ∈[0,4], and each of these four blocks may be also intra predicted by an intra prediction from the same set of intra predictions. For the sake of an example, let's consider a problem of selecting the optimal block size between one whole block or a sub-block constructed by subdivision of the block into four sub-blocks.

The obvious solution for this problem is the exhaustive testing of all the possible options: all the admissible intra predictions for the block B, all the admissible intra predictions for the sub-blocks $B_j$, and then choosing the block best size by SAD or RD-optimization based criterion. It is also obvious that the computational complexity of this method is very high.

The present teachings are based on the concept of the minimal activity directions and are directed to simplify the method of choosing the best subdivision of a texture block into intra blocks.

Algorithm 6.

The method comprises:

considering a texture block B of the size L×L starting from a pixel with coordinates (x, y), and its sub-blocks $B_j$, j ∈[0,4] of the size $$\frac{L}{2} \times \frac{L}{2}$$

starting from pixels with coordinates (x, y), $$\left(x + \frac{L}{2}, y\right),$$

$$\left(x, y + \frac{L}{2}\right),$$

$$\left(x + \frac{L}{2}, y + \frac{L}{2}\right),$$

respectively;

constructing a spatial area S including the block B and the spatial areas $S_j$ including blocks $B_j$, wherein in the simplest case S may coincide with B and $S_j$ may coincide with $B_j$;

calculating the minimal activity direction angles $\phi(\tilde{B},W)$, $\phi(\tilde{B}_j,W)$, wherein $\alpha(\tilde{B}, W)=\cos(\phi(\tilde{B}, W))$, $\beta(\tilde{B}, W)=\sin(\phi(\tilde{B}, W))$;

calculating functions of minimal activity direction (MAD) strength $C_1(\tilde{B},W)$, $C_2(\tilde{B}, W)$, $C_1(\alpha(\tilde{B}, W), \tilde{B}_j, W)$, $C_2(\alpha(\tilde{B},W), \beta(\tilde{B}_j, W),\tilde{B}_j,W)$, where j∈[0,4]; and selecting a single L×L block as the best size, if the MAD strengths for all j∈[0,4] are:

$$C_1(\alpha(\tilde{B},W),\beta(\tilde{B},W),\tilde{B}_j,W) < \lambda_1\mu_1 \cdot C_1(\tilde{B},W), \text{ and}$$

$$C_2(\alpha(\tilde{B},W),\beta(\tilde{B},W),\tilde{B}_j,W) < \lambda_2+\mu_2 \cdot C_2(\tilde{B},W),$$

wherein $\lambda_1$, $\mu_1$, $\lambda_2$, $\mu_2$ are pre-defined parameters of the encoding selected according to the desired speed and quality of the method;

otherwise, selecting the size as a sub-division of block B into four $$\frac{L}{2} \times \frac{L}{2}$$

blocks.

Hierarchical Multi-Level Motion Estimation for Tree-Structured Inter Coding

The proposed methods are directed to reducing the complexity of the HEVC standard video coding without degrading the coding quality.

According to these teachings, the motion estimation starts from the largest block size allowed for the current frame and covers all the possible smaller block sizes in a single estimation process. The method uses a reduced resolution search in a motion estimation scheme based on Algorithm 7 (described below) with only one base motion vector field, wherein the interpolation is used only at the latest stage of motion estimation.

Motion Estimation Suitable for HEVC Encoding

The present method chooses a block size 16×16 as a base block for motion estimation in HEVC encoding, because blocks 4×4 and 8×8 are too small and can introduce an error motion, and blocks 32×32 are too large and can introduce an averaging motion error.

The following proposed method of motion estimation may be used under the HEVC standard.

Algorithm 7.

1. Prepare a reduced resolution image;
2. Perform a reduced resolution search for blocks 64×64;

3. Perform refinement by neighboring blocks;
4. Provide a motion assignment for 16×16 blocks using neighboring blocks;
5. Perform a refinement search for 16×16 blocks;
6. Prepare error distribution (ED) analysis information for split-merge prediction and non-square block selection;
7. Perform a sub-pixel refinement (without assigning vectors);
8. Divide 16×16 blocks into 8×8 blocks;
9. Merge four 16×16 blocks into one 32×32 partition;
10. Merge four 32×32 blocks into one 64×64 partition;
11. Provide a non-square block prediction using the ED field; and
12. Assign quarter-pel to a selected decision.

The following approaches are used to optimize the proposed motion estimation method.

The reduced resolution search, which represents one step in a hierarchical search, is performed using reduced frames by four in both directions (X and Y), and performing reduced resolution search by blocks 16×16 using reduced frames in order to obtain motion for 64×64 blocks in the original frames.

A high quality motion vector field is prepared using Algorithm 8 (described below) for a multi-pass motion vector field refinement in order to obtain a very smooth and regular motion.

A fast motion search may be used in two stages of motion estimation by employing Algorithm 9 (described below) for integer motion estimation using non-parametric local transform.

A motion assignment for 16×16 blocks is performed using non-parametric local transform.

A problem of sub-dividing non-square blocks is herein solved by Algorithm 10 (described below) for choosing between splitting and merging certain blocks using error-distribution analysis.

The entire motion estimation is performed using interger-pel at all stages, and only after a decision is made, it may be refined to quarter-pel.

Multi-Pass Motion Vector Field Refinement

Algorithm 8.

After the motion estimation for a reduced resolution picture is completed, a method of refinement is proposed to make motion field more accurate, regular and smooth. This method comprises:
  selecting a threshold T as a desired percent of all blocks in the picture;
  setting a variable count C=0;
  for every block in the picture:
    using motion vectors of eight neighbor blocks as candidate motion vectors;
    selecting a best motion vector MV by comparing SADs (sums of absolute difference) or any other distance metric; and
    if the vector has changed, incrementing variable count C; and
  if C<T, repeating the step of setting the count C.

This process can be performed multiple times before the number of motion vectors changed during a next pass is more than a selected threshold T.

Non-Parametric Local Transform Based Motion Estimation

Algorithm 9.

In performing steps (2) and (4) of Algorithm 7, it is necessary to find motion vectors in small reference frame area. Typically, the area is +16 pixels. For such purpose one may perform a traditional block-matching procedure by calculating SAD (sum of absolute difference) or another distance metric for all possible positions. This process is very complex and requires an extended memory bandwidth.

However, using a proposed combination of simple filters and vector operations, the motion estimation may be performed without a need of actual block-matching process. In general, any suitable non-parametric local transform may be used as a base of the proposed motion estimation approach.

According to one embodiment, the Census transform is used as a base for algorithm description. The Census transform is a form of non-parametric local transform that relies on the relative ordering of local intensity values, and not on the intensity values themselves. This transform is usually used in image processing to map the intensity values of the pixels within a square window to a bit string, thereby capturing the image structure. The intensity value of a center pixel is replaced by the bit string composed of a set of Boolean comparisons in a square window moving left to right.

Accordingly, a new value of a center pixel (A') calculated as a sum of bits is:

$$A'=(A<Z_i)*2^i,$$

where A is a previous value of center pixel; and
$Z_i$ represents the values of the neighboring pixels.

The Census-transformed image is used to find the correlation of pixels of the original block with the reference pixel area.

The proposed motion estimation algorithm may be divided into several stages:
  1. Performing Census transform for every input frame (gray, 8 bit/pixel);
  2. Splitting a frame into 16×16 blocks and representing it as a 256-bytes vector (M);
  3. Preparing a new 256-bytes vector (B), where at each position addressed by value from vector (A), its actual position in vector (A) is placed (index).
  4. Preparing a correlation surface filled with zeroes (32× 32 bytes);
  5. Subtracting element-by-element vector (A) from vector (B);
  6. Returning into the two-dimensional space and incrementing points of the correlation surface at position given by a resulted vector (B');
  7. Finding a maximum on the correlation surface, which requires a motion vector in full-pels; and
  8. Interpolating a sub-pixel value using neighbor values on the correlation surface.

Error Distribution Analysis

Algorithm 10.

After the actual search is done, for every block 8×8 one can calculate the appropriate SAD. For every block 64×64 pixels one has 8×8 block of SADs which can be referred to as Error Distribution Block (EDB). These teachings use the EDB concept for optimization of Split-Merge decisions.

The method of SPLIT decision optimization comprises:
  declaring SplitThreshold as a desired level of SPLIT sensitivity (in percents);
  calculating average SAD of the whole EDB;
  if any SAD in EDB differs from a calculated average SAD more than the SplitThreshold, marking said block as a SPLIT candidate; and
  performing an additional refinement search for every block marked as SPLIT candidate.

The method of MERGE decision optimization comprises:
  declaring a MergeThreshold as a desired level of MERGE sensitivity (in percents);

preparing an EDB pyramid based on averaging 2×2 block of SADs at each level, wherein the pyramid comprises:
Level 0: an original EDB of 8×8 SADs;
Level 1: averaged once 4×4 SADs;
Level 2: averaged twice 2×2 SADs; and
Level 3: one averaged SAD.
at every level from 1 to 3, examining four correspondence SADs to check MERGE flag;
if all four SADs differ from lower level SAD no more than MergeThreshold, marking this block as a MERGE candidate;
performing a MERGE check for every block marked as MERGE candidate by substituting four small blocks with one large block.

Reduced Resolution Image Preparation

Algorithm 11.

Figure 6:
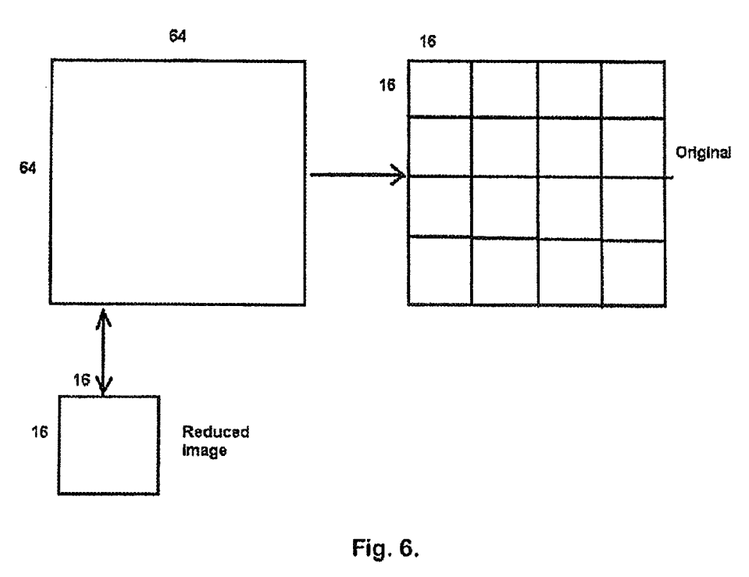
FIG. 6 is a flow diagram showing preparation of a reduced resolution image.

FIG. 6 illustrates the preparation of a reduced resolution image according to Algorithm 11. Every block 64×64 is represented as a 16×16 block. A shifted Gaussian filter is used herein for the reduced image preparation. Every pixel in reduced image (Zx/4,y/4) is calculated as a weighted sum of pixels in the original picture $O_{x,y}$:

$$Z_{x/4,y/4}=(O_{x,y}+2*O_{x+1,y}+O_{x+2,y}+2*O_{x,y+1}+4*O_{x+1,y+1}+2*O_{x+2,y+1}+O_{x,y+2}+2*O_{x+1,y+2}+O_{x+2,y+2})/16$$

This filter reduces computational complexity and provides better encoding quality by reducing the averaging effect as compared with traditional techniques (Simple Averaging, Gaussian Pyramid, and so forth).

Based on the above Algorithms 8-11, the following approach to Motion Estimation for Inter Coding is proposed:
preparing a reduced resolution image using Algorithm 11;
performing a reduced resolution search for blocks 64×64, preferably using Algorithm 9;
performing a refinement by neighboring blocks, preferably using Algorithm 8;
providing a motion assignment for 16×16 blocks using neighboring blocks;
performing a refinement search for 16×16 blocks, preferably using Algorithm 9;
preparing an error distribution (ED) analysis information for split-merge prediction and non-square block selection, preferably using Algorithm 10;
performing a sub-pixel refinement (without assigning vectors);
splitting 16×16 blocks into 8×8 blocks;
merging four 16×16 blocks into one 32×32 partition using Algorithm 10;
merging four 32×32 blocks into one 64×64 partition using Algorithm 10;
providing non-square block prediction using ED field according to Algorithm 10; and
assigning quarter-pel to a selected decision.

Figure 7:
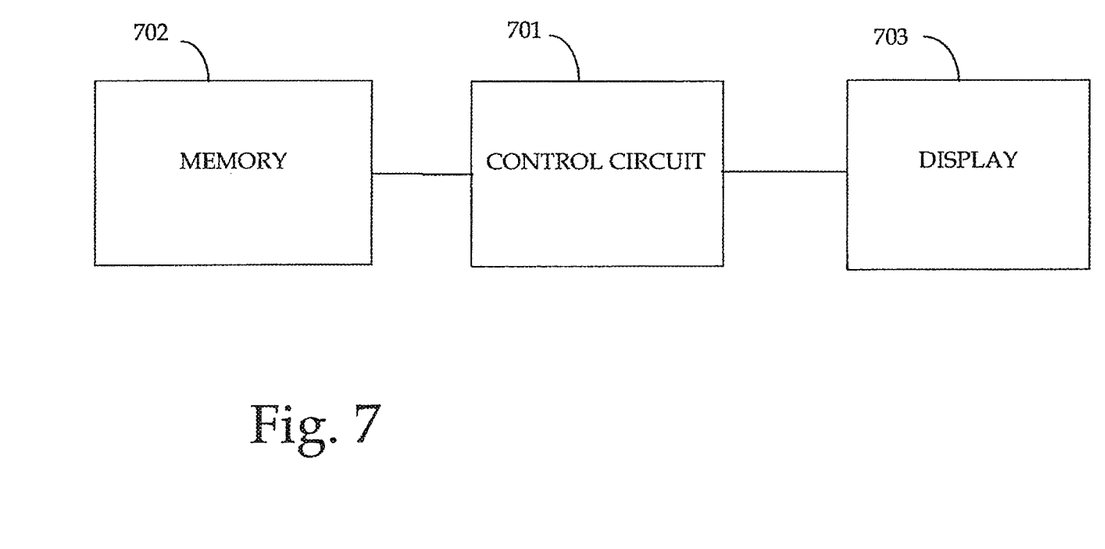
FIG. 7 comprises a block diagram.

In a typical application setting, and referring now to FIG. 7, the various algorithms, steps, actions, and the like described herein can be carried out by a corresponding control circuit 701. Such a control circuit 701 can comprise a fixed-purpose hard-wired platform or can comprise a partially or wholly programmable platform. These architectural options are well known and understood in the art and require no further description here. This control circuit 701 is configured (for example, by using corresponding programming as will be well understood by those skilled in the art) to carry out one or more of the steps, actions, and/or functions described herein.

By one approach this control circuit 701 operably couples to a memory 702. This memory 702 may be integral to the control circuit 701 or can be physically discrete (in whole or in part) from the control circuit 701 as desired. This memory 702 can also be local with respect to the control circuit 701 (where, for example, both share a common circuit board, chassis, power supply, and/or housing) or can be partially or wholly remote with respect to the control circuit 701 (where, for example, the memory 702 is physically located in another facility, metropolitan area, or even country as compared to the control circuit 701).

This memory 702 can serve, for example, to non-transitorily store the computer instructions that, when executed by the control circuit 701, cause the control circuit 701 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

The control circuit 701 can also operably couple, if desired, to a corresponding display 703 that can serve, for example, to depict the processed results as accord with these teachings.

The preceding description is intended to be illustrative of the principles of the invention, and it will be appreciated that numerous changes and modifications may occur to those skilled in the art, and it is intended in the appended claims to cover all those changes and modifications which fall within the true spirit and scope of the present invention.

The invention claimed is:

1. A video codec comprising a control circuit configured and arranged to calculate minimal activity direction based on texture gradient distribution, the minimal activity direction being defined by a vector ($\alpha$(B, W), $\beta$(B, W)) indicating minimal variation of a discrete function P(x, y) inside a spatial area of block B with weights W; the vector ($\alpha$(B, W), $\beta$(B, W)) being a solution of a minimization problem:

$$\sum_{(x,y)\in S} W(x, y) \cdot (\alpha \cdot D_X(x, y) + \beta \cdot D_Y(x, y))^2 \xrightarrow[\alpha,\beta]{} \min;$$

wherein $$\alpha^2+\beta^2=1;$$

P(x, y) is a discrete function defined at a rectangular set of integer pairs:
$R=\overline{\{0,N-1\}}\times\overline{\{0,M-1\}}$ in N×M frame;
S is a set of integer coordinate pairs (x, y), where $S \subseteq R$;
W(x, y) is a set of non-negative weight coefficients defined at a point (x, y)∈S;
$D_x$(x, y) and $D_y$ (x, y) are measures of function P(x, y) variations in the neighborhood of the (x, y) point:

$$D_X(x,y)=(P(x+1,y)-P(x-1,y))/2; \text{ and}$$

$$D_Y(x,y)=(P(x,y+1)-P(x,y-1))/2;$$

wherein $$\Sigma W(x,y)\cdot D_X^2(x,y)+\Sigma W(x,y)\cdot D_Y^2(x,y)\neq 0.$$

2. A video codec of claim 1, wherein the control circuit further configured and arranged to provide simplified selection of an optimal intra prediction by:
choosing a texture block B of size L×L starting with coordinates (x, y);
choosing a spatial area S including the texture block B;

choosing a weight matrix for S, wherein in a simplest case all weights w(j, k)=1;

calculating the minimal activity direction ($\alpha$, $\beta$) and a corresponding angular intra prediction mode;

defining a set Q of intra predictions for selecting an optimal intra prediction mode $P_k$, the set Q including at least a plurality of angular intra predictions for angles $\gamma_0, \gamma_1 \ldots \gamma_{T-1}$, and a plurality of non-angular intra predictions;

calculating minimal activity direction strengths for the block B with weights W;

constructing a reduced set of intra predictions $Q_1$ by excluding from the set Q at least one plurality of intra predictions; and selecting the optimal intra prediction $P_k$ from the reduced set $Q_1$ of intra predictions.

3. The video codec of claim 2, wherein the control circuit further configured and arranged to calculate the minimal activity direction strengths for block B with weights W:

$$C_1(\beta, W) = \frac{\sum_{(x,y) \in S} W(x, y) \cdot (-\beta \cdot D_X(x, y) + \alpha \cdot D_Y(x, y))^2}{\sum_{(x,y) \in S} W(x, y)},$$

$$C_2(\beta, W) = \frac{\sum_{(x,y) \in S} W(x, y) \cdot (-\beta \cdot D_X(x, y) + \alpha \cdot D_Y(x, y))^2}{\sum_{(x,y) \in S} W(x, y) \cdot (\alpha \cdot D_X(x, y) + \beta \cdot D_Y(x, y))^2}.$$

4. The video codec of claim 3, wherein the control circuit is further configured and arranged to construct the reduced set of intra predictions $Q_1$ by excluding at least one plurality of intra predictions from the set Q based on the following:
if $C_1(\tilde{B},W) < X_1$, excluding the plurality of angular intra predictions for the angles $\gamma_0, \gamma_1 \ldots \gamma_{T-1}$;
if $C_1(\tilde{B},W) > X_2$ and $C_2(\tilde{B},W) < X_3$ excluding the plurality of non-angular predictions;
wherein $X_1, X_2, X_3$ are constants for parameters defined by desired speed and quality of encoding.

* * * * *